March 22, 1955
G. B. SHIELDS
2,704,639
RECORDER REPRODUCER APPARATUS
Filed Feb. 16, 1951
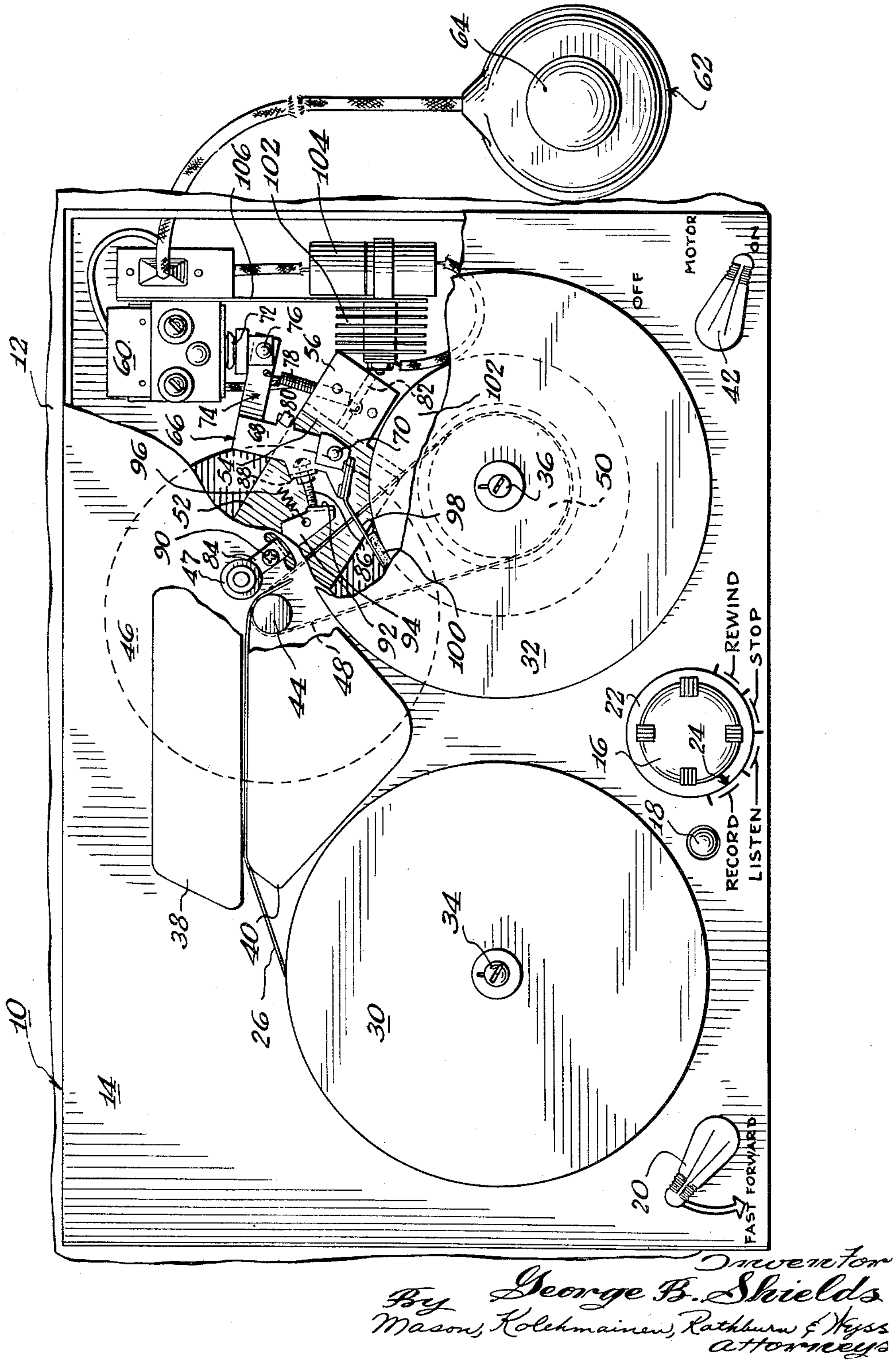
Inventor
George B. Shields
By Mason, Kolehmainen, Rathburn & Wyss
Attorneys United States Patent Office 2,704,639

Patented Mar. 22, 1955

2,704,639

RECORDER REPRODUCER APPARATUS

George B. Shields, Racine, Wis., assignor to Webster Electric Company, Racine, Wis., a corporation of Delaware Application February 16, 1951, Serial No. 211,383

2 Claims. (Cl. 242—55)

The present invention relates to recorder-reproducer apparatus and has for its primary purpose the provision of new and improved apparatus including record medium driving means and auxiliary control means therefor enabling the medium readily to be stopped for as long or short a time as desired from points either near or a distance from the apparatus and without disturbing or operating the main control.

In using recorder-reproducer apparatus it is desirable at times temporarily to stop the forward movement of the record medium without manipulating or changing the main control used to condition the apparatus for its various operations, such as recording, reproducing, rewinding, etc. For example, the main control may be operated to condition the apparatus for recording or reproducing. When this is done the medium (hereinafter referred to as tape) moves forward at a predetermined constant speed. In existing apparatus, the motor has to be stopped or the main control moved to some other position to stop the tape. This is not necessary with the present invention.

In accordance with the present invention there is provided means for stopping the drive of the tape without disturbing or operating the main control. In the illustrated embodiment described hereinafter this means, which may be considered to be an auxiliary control means, operates on the tape drive to render it ineffective temporarily and for as long a period as desired. In apparatus of the type including a capstan-pinch roller type of tape drive and driven take-up spool, the present invention contemplates rendering both the pinch roller-capstan and take-up spool drives ineffective. This can readily be done by moving the pinch roller away from the capstan and applying a brake to the take-up spool drive. In other types of drives other expedients may be used. The auxiliary control means may also be located near or remote from the apparatus.

Other objects and advantages of the present invention will become apparent from the ensuing description of an illustrative embodiment of the invention in the course of which reference is had to the accompanying drawing, the single figure of which is a fragmentary top plan view, partly broken away, of a recorder-reproducer constructed in accordance with the present invention. In the view the apparatus is illustrated in its record position but with the auxiliary control operated to stop the normal drive of the tape and with the recording and erase head cover partly removed and without the cabinet and front plate.

The apparatus of the present invention may be utilized with various types of record medium. It is particularly designed for use with an elongated magnetizable record medium such as a tape coated or impregnated with magnetic material. The apparatus includes a recording device for varying the condition of the medium or tape in accordance with intelligence, the recording device imparting a controlled degree of conditioning to an incremental length of medium in accordance with time variations of said intelligence.

The apparatus of the present invention has not been illustrated in full although so much of it has been illustrated as will enable those skilled in the art to understand the operation and advantages of the invention. The apparatus, however, is disclosed and various features claimed in the copending application of David J. Munroe, application Serial No. 408,235, filed February 4, 1954, which is a continuation of the now abandoned application Serial No. 79,663, filed March 4, 1949.

The apparatus is characterized by the ease with which it may be operated into its various positions and the safeguards which are provided to prevent the accidental operation thereof into a position in which the record upon the tape may be destroyed. In brief, the control may be operated so as to condition the apparatus for (1) recording, (2) reproducing or listening, (3) rewinding, (4) fast speed forward, and (5) a stop position.

Referring now to the drawing, the apparatus which is shown as a recorder-reproducer is indicated as a whole by reference character 10. It includes a suitable cabinet 12 including a top panel or base plate 14. Most of the component parts of the apparatus are located inside of the cabinet and underneath the top panel, and many of the parts are suspended from the top panel.

In the illustrated embodiment of the invention, the apparatus is provided with control means in the form of a control knob 16 for conditioning the apparatus for recording, reproducing and rewinding and also for what is known as a stop condition. This control has associated with it a mechanical interlock operable by a push button 18 so that the apparatus cannot be conditioned for recording, which is accompanied by erasure of whatever record may be on the tape, unless the operator goes through both a thought process and a mechanical operation. The apparatus is also characterized by a fast forward speed enabling a particular intermediate portion of the tape quickly to be located and reproduced. This fast forward speed is accomplished through means comprising a control knob 20 operable from its indicated position to a fast forward position and which is effective to condition the apparatus for drive of the tape at a fast forward speed only when the apparatus is in its listen position.

The control knob 16 is adapted readily to be grasped by the operator and rotated into its various positions. It is located near the center and at the front of the top panel so that its position can be readily noted and so that it can be easily operated. In order readily to note the position of the knob, it is provided with an enlarged lower skirt-like portion 22 upon which is formed a pointer 24 cooperating with suitable indicia printed or otherwise suitably formed on the top panel to indicate the four above referred to positions. In the figure the apparatus is illustrated in its record position.

The tape, indicated by reference character 26, is supported above the top panel in spaced apart tape supply and take-up spools 30 and 32, respectively, and adapted suitably to be supported and driven as through the spool and take-up spool shafts 34 and 36, respectively.

The tape is suitably guided in its movement between the two spools past suitable record-reproduce transducer means not shown, but which are located underneath the cover plates 38 and 40. The tape is driven in either forward or rewind direction by motor operated means, not shown, of which the motor is controlled by a switch operated by a control knob 42 movable between off and on positions. This knob is shown in its position, so that with the control knob in its indicated position, the apparatus is conditioned for driving the tape in its forward direction at a constant predetermined speed.

The tape is driven in the forward direction at a constant predetermined speed by what may be termed a capstan-pinch roller type of drive including a capstan 44 driven at a constant speed by the motor whenever the motor is energized and having associated with it a flywheel 46. In the forward drive the tape is pressed against the capstan by a pinch roller 47 selectively movable into and out of engagement with the capstan and tape under control of the main control, and which is shown out of contact with the tape or capstan, as it is when the auxiliary control of the present invention has been operated temporarily to render the tape driving means ineffective.

In the so-called forward drive of the tape, the tape is wound upon the take-up spool. This spool is driven through a standard forward drive including a slip type drive including a belt 48 driven by the capstan and driving the take-up spool shaft, and thus the spool, through a pulley 50. The belt is located underneath the top panel and between the latter and a generally U-shaped capstan-flywheel mounting bracket 52 suitably secured underneath the top panel. The bracket includes upwardly extending leg portions 54, of which but one is shown, and flanges 56 through which the actual securement is obtained.

The present invention provides a readily operable and effective means for terminating the forward movement of the tape when desired and without disturbing or requiring the manipulation of the main control. In brief it comprises, in the illustrated apparatus, a means for rendering both the pinch roller and take-up spool drives ineffective and this by moving the pinch roller away from the tape and capstan and by braking the take-up spool drive. The movement of the pinch roller and application of the brake are readily accomplished through operating means which may take the form of a solenoid 60 energizable from a suitable point, which may be remote from the apparatus, as through a foot operated switch 62 including a depressable element 64 adapted when depressed to energize the solenoid. The switch may, it should be noted, be moved to be close to the apparatus—or, if desired, a push button switch could be mounted directly upon the apparatus.

The pinch roller and brake are operated through what may be called a kick-out lever assembly indicated as a whole by reference character 66. This assembly includes a lever 68 mounted for pivotal movement about a pin 70 attached to and depending slightly below the top panel. The lever is operatively connected to a solenoid plunger 72 through an arm 74 and a pivot pin 76. The solenoid is shown energized, whereby the lever is in its extreme counterclockwise position, from which it is returned to what might be termed its normal position by a biasing spring 78. This normal position is determined by engagement of a bumper 80 on the lever with the vertical leg 54 of the mounting bracket 52. The spring has one end attached to the leg 74 of the lever and the other end to a dependent web 82 secured to the leg 54 and flange 56.

The kick-out lever 68 is operatively connected to the pinch roller 47 through the pinch roller supporting lever 84 and an adjustable screw 86 secured to a dependent flange 88 on the lever 68. The pinch roller lever 84 pivots about a pivot pin 90 secured to the top panel and a portion 92 of the lever, below the top panel, has a dependent flange 94 in engagement with the end of the screw 86. The flange and screw are maintained in engagement by the pinch roller lever biasing spring 96 which also biases the lever in a direction to effect engagement of the pinch roller with the capstan. The arrangement is thus such that when the solenoid 60 is energized the lever is moved counterclockwise whereupon screw 94 moves the pinch roller lever in a clockwise direction to disengage the pinch roller from the capstan. When the solenoid is deenergized the spring 78 returns the kick-out lever assembly to its normal position and the spring 96 reengages the pinch roller with the capstan.

In accordance with another feature of the present invention, the drive of the tape by the take-up spool is also rendered ineffective, this being accomplished by braking the take-up spool drive. This is accomplished as through a brake lever 98 suitably secured to the kick-out lever 68. The lever is somewhat resilient and carries a brake pad 100 at its outer end. The pad is engageable with a disc 102 associated with the take-up spool drive and constituting, as fully disclosed in the above referred to copending application of David J. Munroe, what is called a fast forward drive disc that is also utilized in the fast forward drive of the tape. The brake 98, 100 is preferably an auxiliary brake, there being another take-up spool brake (see the Munroe application) that is applied in the stop position of the main control.

The solenoid may be supplied with power from some suitable source, not shown. The solenoid is preferably a direct current solenoid which may be supplied with direct current from an alternating current source through a selenium rectifier 102. The solenoid, the rectifier, and an associated electrolytic capacitor 104 may all be mounted upon a mounting bracket 106 suitably secured in the apparatus.

In operation, the apparatus is supplied with power from a suitable source and then turned on as through a suitable switching means including the motor switch operating knob 42 which is turned to its indicated on position. In the further description of the operation, it is assumed that the apparatus has been conditioned for recording as indicated in the drawing. At this time the tape is driven in forward direction at a standard predetermined constant speed through the capstan and pinch roller drive, the capstan being driven by the motor. The tape is taken up on the take-up spool which is driven through the belt 48 and pulley 50.

Should it be desired to stop the forward movement of the tape for a short or even a longer period, all that is necessary is that swtich 62 be operated whereupon the solenoid 60 is energized to operate the kick-out lever assembly. When this is done the pinch roller-capstan drive of the tape is terminated and simultaneously the brake is applied to the take-up spool whereupon all drive of the tape is terminated. When it is desired to re-start the tape, the switch is released with the result that the solenoid is deenergized and the kick-out lever assembly returns to its normal position wherein the pinch roller is effective and the brake is ineffective.

The present invention provides a very simple means for controlling tape movement from points near or remote from the apparatus and without disturbing or requiring manipulation of the main control. This is advantageous as when the record being made is of such nature as to require brief pauses for consultation, discussion or the like.

While the present invention has been disclosed in connection with details of an illustrative embodiment, it should be understood that these details are not intended to be limitative of the invention except as insofar as set forth in the accompanying claims.

What is claimed as new and desired to be secured by Letters Patent of the United States is:

1. In an elongated record medium driving apparatus, the combination including, a pinch roller engageable with the medium, a driven medium take-up spool, pinch roller moving means, take-up spool braking means, means including main control means having a setting for engaging the pinch roller with the medium, and auxiliary control means controlling said pinch roller moving means and said braking means for substantially simultaneously effecting disengagement of the pinch roller from the medium and rendering said braking means effective independently of said setting of said main control means.

2. In an elongated record medium driving apparatus, the combination including, record medium driving means, a driven medium take-up spool, braking means for said spool, first means movable to a first setting for rendering said medium driving means effective and to a second setting for rendering said driving means ineffective, and second control means operative in the first setting of said first control means for temporarily rendering said driving means ineffective and for operating said braking means.

References Cited in the file of this patent

UNITED STATES PATENTS

| | | |
|---|---|---|
| 2,328,597 | Woolf | Sept. 7, 1943 |
| 2,408,320 | Kuhlik | Sept. 24, 1946 |
| 2,467,507 | Stone | Apr. 19, 1949 |
| 2,540,299 | Shoup et al. | Feb. 6, 1951 |
| 2,555,643 | Harrison | June 5, 1951 |
| 2,626,760 | Chick | Jan. 27, 1953 |

FOREIGN PATENTS

| | | |
|---|---|---|
| 459,035 | Great Britain | Dec. 31, 1936 |